Sept. 9, 1947.   R. E. MATHES   2,427,292
MEANS FOR PRODUCING SMOOTH ACCELERATION IN POSITIVE DRIVE CLUTCHES
Filed Dec. 10, 1942
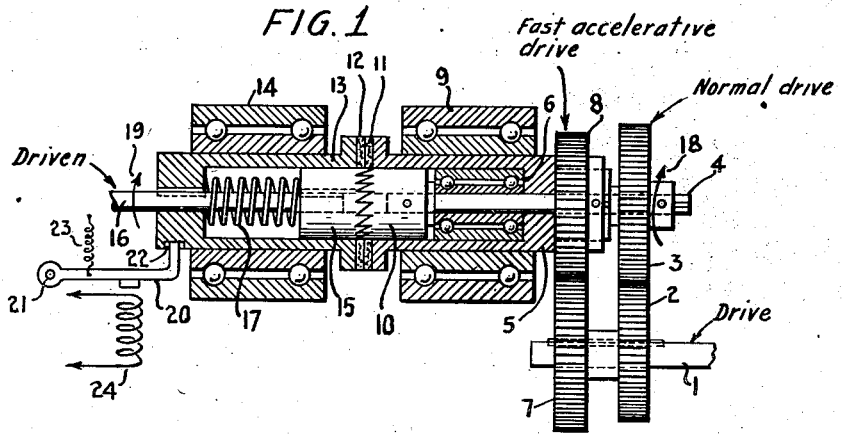
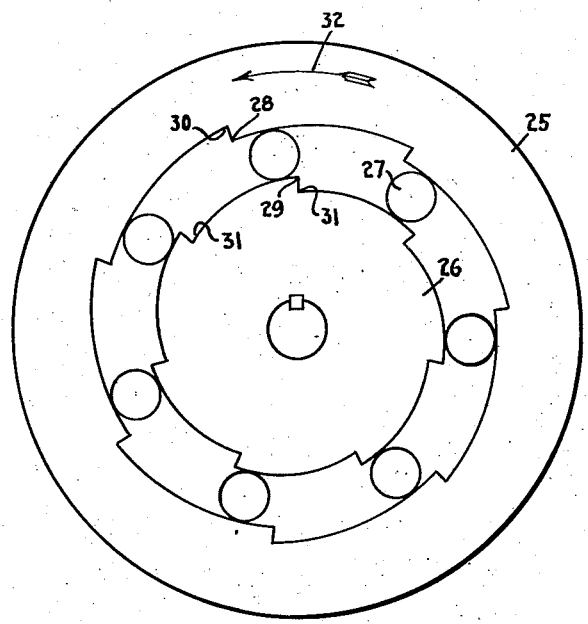
INVENTOR.
RICHARD E. MATHES
BY
ATTORNEY Patented Sept. 9, 1947

2,427,292

UNITED STATES PATENT OFFICE 2,427,292

MEANS FOR PRODUCING SMOOTH ACCELERATION IN POSITIVE DRIVE CLUTCHES

Richard E. Mathes, Silver Spring, Md., assignor to Radio Corporation of America, a corporation of Delaware Application December 10, 1942, Serial No. 468,538

7 Claims. (Cl. 192—53)

There are many uses for positive drive clutches in which the driven shaft must reach the driving speed by rapid and smooth acceleration with minimum period of overrun. One example of this is receiving distributors in multiplex telegraphy, though the invention is not to be limited to that use. In such use, the distributor or other member should start substantially instantaneously and accelerate smoothly to, and lock in at, the synchronous speed as soon as it is reached.

It is an object of my invention to provide a positive drive clutch that accelerates quickly and smoothly to the desired speed, where it locks in with no overrun, to provide a positive drive after the desired speed has been reached.

Another object of the invention is to provide a friction clutch tending to drive the driven member above the desired speed and prevent it from exceeding the desired speed by a positively acting clutch.

Other objects will appear in the following description, reference being had to the drawings, in which:

Figure 1 is a sectional elevation of the improved clutch mechanism.

Figure 2 is a modified form of ratchet clutch for use in the mechanism shown in Figure 1.

Referring to Fig. 1, the drive shaft 1, driven by any means, has a gear 2 meshing with a gear 3 keyed to shaft 4, which is journaled in a sleeve 5 by any desired means, for example by thrust ball bearing 6. The shaft 1 also has keyed thereon a gear 7 which may, if desired, be made integral with gear 2. Gear 7 meshes with gear 8 keyed to the sleeve 5. This sleeve is journaled in the stationary part, not shown, in any way; for example, by thrust ball bearing 9.

Shaft 4 has rigidly keyed thereon a one-way positive drive crown clutch member 10. This clutch member loosely fits in the sleeve 5. Sleeve 5 also has a friction clutch driving member 11 engaging another friction clutch driven member 12 on sleeve 13. Sleeve 13 is journaled in the stationary part by means of a thrust bearing 14.

Sleeve 13 contains crown clutch engaging member 15, the teeth of which mesh with the crown clutch engaging member 10. Clutch member 15 is splined on driven shaft 16, which is rigidly keyed to sleeve 13. Spring 17 yieldingly maintains the clutch members 10 and 15 together.

The teeth on the crown clutch 10, 15 are so cut as to permit the clutch member 15 to ratchet over or slip when shaft 4 is rotating in the direction of the arrow 18, either while shaft 16 is stationary or is rotating in the direction of the arrow 19 at a speed below the synchronous speed of shaft 4.

The driven shaft 16 may be fastened to a telegraph distributor, telegraph printing mechanism, or any other part.

The sleeve 13 is the member that is intermittently rotated and has means for stopping this rotation typified by stop lever 20 pivoted at 21 in any stationary part. This stop lever has a detent fitting in a suitable depression 22 in the sleeve, in which position it is yieldingly positioned by a spring 23. The stop lever may be removed from its locking position by any means, such as a magnet 24.

The operation of my improved clutch mechanism is as follows:

Let it be supposed that shaft 1 is driven at the desired synchronous speed and that the sleeve 13 is held stationary by the detent in notch 22. In this condition, the friction surface of the driving member 11 will slide over friction surface 12 and the teeth of crown clutch member 10 will snap over the teeth in crown clutch member 15, the latter slipping to the left in Fig. 1 to permit this. If it is desired to start the driven shaft 16 and bring it quickly up to the synchronous speed of shaft 4, for example by a signal energizing magnet 24, the detent would be removed from notch 22 and sleeve 13 and crown clutch member 15 will be rotated in the direction of the arrow 19 by gears 7, 8, sleeve 5, friction clutch 11, 12 and sleeve 13. The ratio of the two trains of gears 2, 3 and 7, 8 is such as to produce a considerably faster rotation of gear 8 than gear 3. Consequently, the slipping of the one way positive crown clutch will decrease as engaging member 15 gains on engaging member 10. When shaft 16 is brought up to speed of shaft 4, the teeth on clutch member 15 positively lock with the teeth on clutch member 10 and gears 7 and 8 cannot drive shaft 16 any faster because the positive clutch driven by gears 2 and 3 positively prevents this. From then on, the slippage will occur at the friction clutch 11 and 12 and shaft 16 will be maintained in absolute synchronism with shaft 4.

In my improved clutch mechanism, the slant of the teeth in the crown gear 10, 15 is directly opposite to the usual slant in a positive drive clutch. That is, if there were no other means for driving the shaft 16 than by the positive clutch, the crown gear clutch would slip and not produce a positive drive. The reason for this is that the crown gear clutch member 10, 15 is really not a driving clutch but an overspeed clutch. The driving is accomplished through the friction clutch 11, 12 which tends to drive shaft 16 at a considerably higher speed than shaft 4, but the crown gear clutch 10, 15 will not permit this so that absolute synchronism is maintained and quick and smooth acceleration is provided from start of shaft 16 up to full synchronous speed.

While it is feasible to use a crown clutch 10, 15 as described, particularly when the teeth are made of hardened steel or other suitable material, in some cases I prefer to use the ball or roller bearing positive clutch as shown in Fig. 2. In Fig. 2 the member 25 may be made the engaging part corresponding to crown clutch member 10 in Fig. 1 and the part 26 may be the engaging member corresponding to crown clutch 15 in that figure, but this may be reversed if desired. The member 26 may be fastened to shaft 4 in an obvious way and member 25 may be rigidly keyed to shaft 16, as side play is unnecessary in this form of clutch. As shown in the drawing, there are seven rollers or balls 27 positioned in between the members 25 and 26, although any number of these may be used. There is a tooth 28, 29 on the members 25 and 26, respectively, for each of the balls or rollers and these teeth are so designed that the radial distance between a tooth 28 and a tooth 29 is less than the diameter of the roller or ball 27, but the radial distance between the depressions 30, 31 at the base of the teeth is greater than the diameter of the ball. If member 25 is the engaging member rotating in the direction of the arrow 32, the vertical side 28, 30 of a tooth will be the leading side and the vertical side 29, 31 of a tooth will be the trailing side. This is the reverse of the usual clutch arrangement because, as already explained, this positive clutch is used to prevent overrunning of the driven member and not to drive it.

It will be apparent that when the clutch of Fig. 2 is substituted for the crown clutch of Fig. 1, the operation will be the same as already described for Fig. 1 with the crown clutch.

My invention is not to be limited to any form of friction or positive drive clutch, as various forms may be used for producing the same action.

Having described my invention, what I claim is:

1. In a transmission for transferring movement from a drive shaft to a driven shaft, means including a friction clutch for tending to drive the driven shaft at a speed greater than a desired speed, means for limiting the speed of the driven shaft to the said desired speed including a one-way positive clutch having its engaging members operatively connected between the drive and driven shafts, one engaging member of said one-way positive clutch being drivingly connected with the driven element of said friction clutch.

2. In a transmission for transferring movement from a drive shaft to a driven shaft, means including a plurality of gears and a friction clutch for tending to drive the driven shaft at a speed greater than a desired speed, means for limiting the speed of the driven shaft to the said desired speed including a one-way positive clutch having its engaging members operatively connected between the drive and driven shafts, one engaging member of said one-way positive clutch being drivingly connected with the driven element of said friction clutch.

3. In a transmission for transferring movement from a drive shaft to a driven shaft, means including a friction clutch for tending to drive the driven shaft at a speed greater than a desired speed, means for limiting the speed of the driven shaft to the said desired speed including a one-way positive clutch having its engaging members operatively connected between the drive and driven shafts, a hollow sleeve member secured for rotation with said driven shaft, a spring member located within said hollow sleeve to yieldingly maintain the engaging members of said one-way positive clutch in engagement, one engaging member of said one-way positive clutch being drivingly connected with the driven element of said friction clutch.

4. In a transmission for transferring movement from a drive shaft to a driven shaft, means including a friction clutch for tending to drive the driven shaft at a speed greater than a desired speed, means for limiting the speed of the driven shaft to the said desired speed including a one-way positive clutch having ratchet engaging members operatively connected between the drive and driven shafts, one ratchet engaging member of the one way positive clutch being drivingly connected with the driven element of the friction clutch.

5. In a transmission for transferring movement from a drive shaft to a driven shaft, means including a friction clutch for tending to drive the driven shaft at a speed greater than a desired speed, means for limiting the speed of the driven shaft to the said desired speed including a one-way positive clutch having its engaging members operatively connected between the drive and driven shafts, one engaging member of said one-way positive clutch being drivingly connected with the driven element of said friction clutch, and means for intermittently holding said driven shaft stationary.

6. The combination of a driving and a driven shaft, a gear train connecting said shafts for rotation at a predetermined speed, a second gear train for connecting said shafts tending to rotate the same at a higher speed, and means whereby the said second train will drive the driven shaft at all speeds below the predetermined speed and the first said train will drive the same at such speed, comprising a slip clutch in the second gear train and a one-way overrunning clutch in the first train.

7. A mechanism comprising a first shaft, a second shaft aligned therewith, sleeves on said shafts arranged in end to end relationship, the sleeve on the first shaft being rotatable thereon and the sleeve on the second shaft being keyed thereto, means for rotating the first shaft at a desired maximum speed, instrumentalities including a slip clutch between adjacent ends of said sleeves tending to rotate the second shaft at a higher speed for quick acceleration to such desired maximum speed, and a one-way overrunning clutch mounted on the adjacent ends of said shafts for automatically clutching the same together when the rotation of the second shaft attains the desired maximum speed.

RICHARD E. MATHES.

REFERENCES CITED

The following references are of record in the file of this patent:

UNITED STATES PATENTS

| Number | Name | Date |
| --- | --- | --- |
| 2,082,129 | Van Ranst | June 1, 1937 |
| 2,242,272 | Swan | May 20, 1941 |

FOREIGN PATENTS

| Number | Country | Date |
| --- | --- | --- |
| 42,370 | Denmark | May 26, 1930 |